Oct. 21, 1969    A. J. GIDDINGS    3,473,504
WATER TURBINE DRIVE FOR SPINNING FLAP CONTROL
(OR FLETTNER ROTOR CONTROL)
Filed Jan. 26, 1968
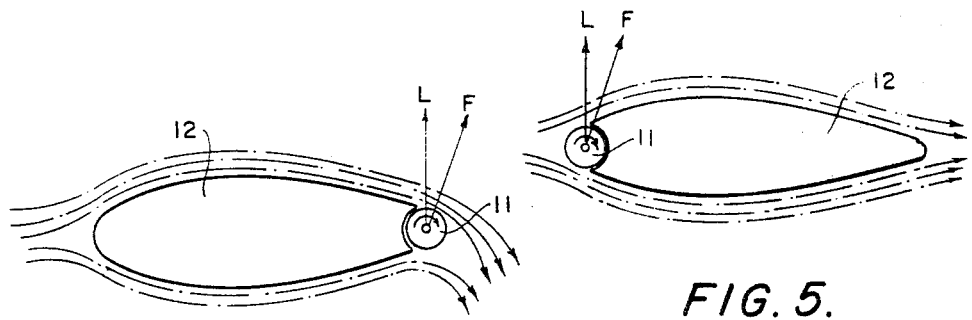
FIG. 3.
FIG. 5.
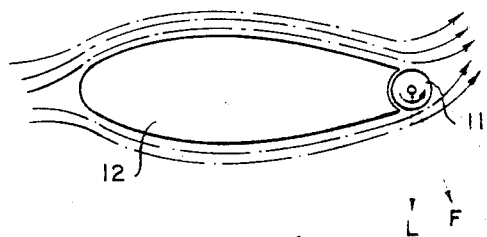
FIG. 4.
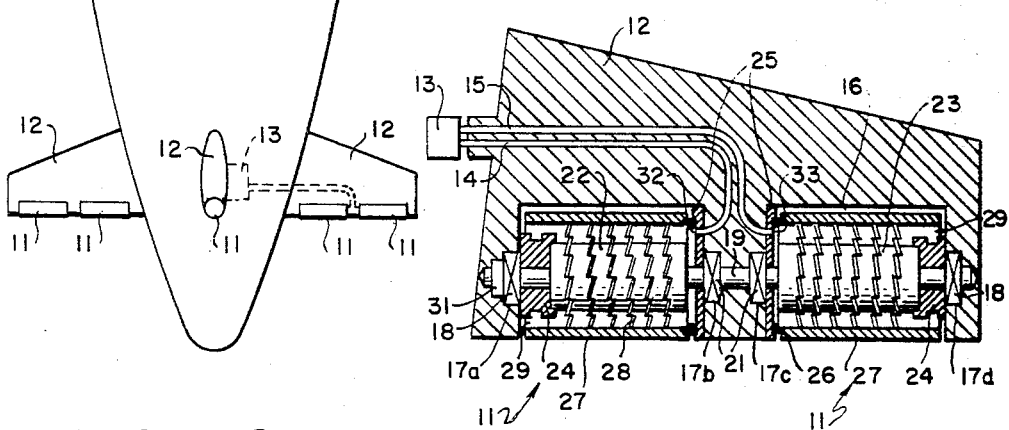
FIG. 2.
FIG. 1.
INVENTOR
ALFRED J. GIDDINGS
BY
ATTORNEYS United States Patent Office 3,473,504
Patented Oct. 21, 1969

3,473,504
WATER TURBINE DRIVE FOR SPINNING FLAP CONTROL (OR FLETTNER ROTOR CONTROL)
Alfred J. Giddings, Kensington, Md., assignor to the United States of America as represented by the Secretary of the Navy
Filed Jan. 26, 1968, Ser. No. 700,894
Int. Cl. B63h 25/06, 25/42
U.S. Cl. 114—162                               4 Claims

ABSTRACT OF THE DISCLOSURE

A cylinder inserted in the trailing or leading edge of a control surface, rotated at high speeds, thereby altering the flow around the control surface, providing lift as a function of spin rate and direction.

The invention described herein may be manufactured and used by or for the Government of the United States of America for governmental purposes without the payment of any royalties thereon or therefor.

BACKGROUND OF THE INVENTION

This invention relates to stabilizing and control surfaces for submersibles and more particularly to control surfaces using rotatable cylinders disposed in a manner to provide lift by the "Magnus effect."

Bow and stern driving planes on submersibles suffer from certain design limitations which have not been overcome. The bow planes, required to rig in or be housed within the fair hull lines, are not easily supported when given great span and a large aspect ratio. Furthermore, their inner ends can rarely lie close against the hull, with a small gap throughout the complete range of rise and dive angles. To produce the maximum possible vertical forces for a given weight and size of installation, the planes are often worked far beyond the normal breakdown range of a symmetrical hydrofoil.

An effective compromise to meet all these conditions calls for an aspect ratio of approximately 1.0, with little cantilever or image effect. The principles involved in the design of planing surfaces for submersibles also apply to a steering rudder in a vertical plane.

The nonhousing diving planes of a submarine are so near the surface, when the vessel is not awash or submerged, that in a heavy sea they are subject to severe impact in the form of wave slap. Normally, these planes are designed to withstand as a working load an impact pressure of 1000 lb. per square foot over their entire horizontal area. Furthermore, a plane form well adapted for operation at low speeds will provide a control area which may overcontrol at higher speeds and which will increase the overall drag on the submersible because of the relatively large surface required to deflect the direction of flow at lower speeds. Conventional control surfaces of the prior art are a compromise between maneuverability at low speeds and safety at high speeds. These problems can be solved by use of a control surface the same size, or smaller, as those presently in use but capable of both rotation and conventional operation.

SUMMARY

The general purpose of this invention is to provide a control surface that has all of the advantages of prior art devices and has none of the above-described disadvantages. To attain this, the present invention provides a "spinning flap" in the trailing or leading edge of a diving plane or other control surface to provide controlled lift magnitude and direction. The present invention may be used in conjunction with movable or fixed control surfaces: to control transient and steady motions in a straight line parallel to the submarine axis; steering and turning in a plane that is horizontal or nearly so; and rising, diving, and depth-keeping in a vertical plane.

Maneuvering is accomplished according to the present invention by using a spinning flap operating on the principle of the so-called "Magnus effect." The spinning flap is driven by turbines located within the cylinders forming the spinning flap. Each turbine is arranged to rotate the spinning flap in a direction opposite to the direction of rotation of the other, this direction being dependent upon the routing of the driving fluid to the turbines. Rotation of the spinning flap in a stream of fluid will produce a lift component or force perpendicular to the direction of the flow of the fluid. The word "lift" as used in this specification is related to the component of fluid dynamic forces acting on a hydrofoil, exerted perpendicular to the relative flow. The amount of lift depends on the speed of rotation and the direction of lift depends on the direction of rotation. Thus a spinning flap control surface may comprise a smaller control area and still have an equivalent control effect.

An object of the present invention is to provide control apparatus for submersibles which is simple in construction and hydrodynamically efficient in operation.

Another object is to provide directional control to a submersible using the Magnus effect principle.

A further object is to provide a rotating cylinder to control the lift of a control surface of a submersible.

Still another object is to provide a turbine drive for operating a rotating cylinder to control the lift of a control surface.

BRIEF DESCRIPTION OF THE DRAWINGS

Other objects and advantages of the invention will hereinafter become more fully apparent from the following description of the annexed drawings, which illustrate a preferred embodiment, and wherein:

FIG. 1 is a sectional view of the preferred embodiment of the invention.

FIG. 2 is a plan view of the invention mounted on the aft end of the hull of a submersible.

FIG. 3 shows schematically the manner of operation providing downward lift.

FIG. 4 shows schematically the manner of operation providing upward lift.

FIG. 5 shows an alternative embodiment of the invention.

DESCRIPTION OF THE PREFERRED EMBODIMENT

FIGS. 1 and 2 illustrate a preferred embodiment of the spinning flap 11 in the form of a hollow cylindrical body mounted for rotation on a fore or aft located control surface 12. FIGS. 3, 4 and 5 illustrate the principle known as the Magnus Effect and its relationship to this invention. When a surface such as spinning flap 11 is mounted, as shown in FIG. 1, so as to be capable of spinning freely and is placed in a stream of fluid such as air or water, it will rotate or may be driven to rotate in either direction. This rotation will produce a lift, or force, perpendicular to the direction of fluid flow. The lifts thus obtained are relatively small but the lift from a rotating section in a stream of a given velocity can be greatly increased by raising its speed of rotation by driving the rotor with an external power source.

FIG. 3 illustrates a spinning flap 11 rotating in a stream of fluid. Skin friction of the spinning flap 11, plus the viscosity of the fluid, impart to the surrounding fluid a rotational velocity or circulation about the spinning flap. The separate velocities due to translation and rotation have been added vectorially, resulting in the asymmetrical flow pattern shown. The velocity of the flow above the spinning flap 11 has been increased, while that below has been decreased. The static pressure of a stream rises as its velocity is decreased and falls as its velocity is increased, according to Bernoullis' principle. The effect of rotating the spinning flap 11 clockwise, as shown in FIG. 3, in the stream is to raise the pressure on its lower side where the stream velocity has been decreased, and to lower the pressure on its upper side where the stream velocity has been increased. This difference in pressure across the control surface caused by the spinning flap 11 constitutes the "lift," the force which is useful for steering. Increasing or decreasing the rotational speed will result in an increase or decrease in lift. The lift contributions of the spinning flap shown in FIGS. 3 and 5 are shown acting upwards, whereas reversing the direction of rotation of the spinning flap 11, as shown in FIG. 4, causes an equal "lift" to act downwards.

As illustrated in FIG. 1, there is provided a spinning flap 11 rotatably mounted in the trailing edge of control surface 12. Multiple position valve 13 which communicates with a sump, or the like, of a fluid supply system, provides fluid under pressure to either fluid passages 14 or 15, located in control surface 12, depending upon the desired direction of rotation of spinning flap 11. Valve 13 (details not shown) may be a conventional valve having a fitting (not shown) thereon for receiving fluid under pressure and an output fitting connected to the inputs of fluid passages 14 and 15 for operating the spinning flap 11. Recesses 16 are provided in control surface 12 with sufficient clearance for mounting spinning flap 11. Cavities 17a and 17b in the end walls of control surface 12 support the outer portion of outboard bearings 18, the inner portion of which provide rotatable support for the outboard ends of spinning flap rotor shaft 19. Rotor shaft 19, supported near its midpoint by inboard bearings 21, located in cavities 17c and 17d, acts as a common shaft for inboard turbine 22 and outboard turbine 23 which are secured to rotor shaft 19. Thrust bearings 24 may be provided to absorb the thrust upon the rotor shaft 19 due to pressure gradient of the driving fluid. A stationary end plate 25 fits tightly against the center section of control surface 12, thereby isolating inboard bearings 21 and the connecting rotor shaft 19 from air flow. A fluid rotary seal 26 may be provided between end plate 25 and the sleeve 27 of spinning flap 11.

The hollow cylinder forming each spinning flap 11 includes an axial rotor shaft 19 substantially perpendicular to the longitudinal axis of the submersible, inboard turbine 22, outboard turbine 23, and turbine cylinders 27, assembled in such a manner as to form a single rotatable turbine driven unit. Turbines 22 and 23 may comprise conventional water or gas turbine blades formed from a corrosion resistant material such as stainless steel, for example.

Apertures 29 are provided in the outboard ends of spinning flap 11 to allow the driving fluid to be exhausted into the surrounding medium.

As shown in FIG. 1, the blades 28 of inboard turbine 22 are angularly pitched relative to the axis of rotor shaft 19 to provide a driving torque for the shaft 19 in the direction as shown by the arrow in FIG. 4. The blades 28 of outboard turbine 23 are angularly pitched relative to the axis of rotor shaft 19 to provide a driving torque for the shaft 19 in the direction opposite that depicted in FIG. 4, as shown by the arrow in FIG. 3.

DESCRIPTION OF THE OPERATION

In the operation of the spinning flap illustrated in the preferred embodiment, fluid under pressure is supplied to valve 13. Valve 13 is switched to direct fluid under pressure to passage 14 in control surface 12 through the aperture 32 in plate 25 where the fluid under pressure is directed at turbine blades 28 of inboard turbine 22. Fluid continues flowing through inboard turbine 22, thus rotating turbine 22 and the cylinder 27 surrounding turbine 22. The fluid is then exhausted through apertures 29 into the surrounding medium. Outboard turbine 23, interconnected with inboard turbine 22 and thus rotated by rotor shaft 19, is also caused to rotate in the same direction as the driving inboard turbine 22. Tachometer 31 attached to rotor shaft 19 detects the status of the spinning flap 11.

To reverse the direction of rotation of spinning flap 11, valve 13 is switched to direct fluid under pressure to passage 15 in control surface 12, through aperture 33 in plate 25 where the fluid under pressure is directed at turbine blades 28 of outboard turbine 23. Rotation of turbines 22 and 23 are effected in the manner described above.

The spinning flap of this invention may be used in conjunction with totally moveable or flapped appendages with attendant moving-rotating hull penetrations. Using the spinning flap in combination with a fixed control surface eliminates the disadvantages inherent in the totally moveable foil or flapped appendages. In addition, the relatively quick lift-changing characteristics require comparatively lower power—particularly important to submarines and hydrofoils.

Thus a spinning flap to provide directional control to a submersible using the Magnus Effect principle has been described. The spinning flap of this invention is simple in construction and hydrodynamically efficient in operation.

Obviously many modifications and variations of the present invention are possible in the light of the above teachings. It is therefore to be understood that, within the scope of the appended claims, the invention may be practiced otherwise than as specifically described.

What is claimed is:

1. Apparatus for controlling an underwater body comprising:
   a pair of forward control surfaces mounted forward of the center of gravity, one on each side of said body;
   a pair of after control surfaces mounted aft of the center of gravity, one on each side of said body;
   said forward and after control surfaces having a leading edge and a trailing edge defined with reference to a movement of fluid to which they are subjected, and being of fixed wing-like configuration and profile to provide planing surfaces;
   flap means rotatably mounted in the trailing edge of each of said forward and after control surfaces and having internal turbines capable of being fluidly driven;
   drive means, having an output, mounted in said body fluidly communicating with and capable of driving said turbines; and
   valve means for selectively switching the output of said drive means to control the direction and velocity of rotation of said flap means and thereby varying the direction and resultant normal forces created by a movement of fluid over said control surfaces.

2. Apparatus according to claim 1 wherein said flap means are adapted for rotation in the leading edge of said forward and after control surfaces.

3. A spinning flap for controlling an underwater body of the type having a plurality of extended fixed control surfaces whereupon fluid is adapted to flow and produce hydrodynamic force vertical to the direction of movement of the body, said control surfaces having fluid passages therein and a leading edge and a trailing edge defined with reference to a movement of fluid to which they are subjected, the improvement comprising:
   a rotatably supported rotor shaft mounted in the trailing edge of each of said control surfaces having a first end, a second end and a midpoint;
   an inboard turbine having blades angularly pitched relative to the axis of said rotor shaft to provide a driving torque in a first direction, fixedly mounted near a first end of said rotor shaft;

a first cylindrical sleeve fitted around said inboard turbine and fixedly attached to rotate with said turbine;

an outboard turbine having blades angularly pitched relative to the axis of said rotor shaft to provide a driving torque in a second direction fixedly mounted near a second end of said rotor shaft;

a second cylindrical sleeve fitted around said outboard turbine and fixedly attached to rotate with said turbine;

outer bearing means on said first and second ends of said shaft and mounted in said control surfaces to provide a journal for said rotor shaft;

inner bearing means on said midpoint of said rotor shaft and mounted in said control surface to provide a journal for said rotor shaft;

a first plate having a plurality of apertures, mounted on said control surface, between said inner bearing means and abutting said first cylindrical sleeve and including first aperture means for directing fluid at said inboard turbine, seal means for forming a substantially fluid tight seal with said first cylindrical sleeve and second aperture means for forming a passageway and a substantially fluid tight seal with said rotor shaft;

a second plate, having a plurality of apertures, mounted on said control surface, between said inner bearing means and abutting said second cylindrical sleeve and including first aperture means for directing fluid at said outboard turbine, seal means for forming a substantially fluid tight seal with said second cylindrical sleeve and second aperture means for forming a passageway and a substantially fluid tight seal with said rotor shaft; and drive means mounted in said body, having a fluid output, communicating with valve means and passages in said control surfaces to said first apertures in said first and second plates to provide fluid under pressure and thereby control the direction and velocity of rotation of said spinning flap with a resultant change in external forces on said control surfaces.

4. Apparatus for controlling an underwater body of the type having control surfaces over which fluid flows to produce a hydrodynamic force normal to the direction of movement of the body comprising:

a plurality of control means mounted on said body, said control means having a leading edge and a trailing edge defined with reference to a movement of fluid to which they are subjected;

flap means adapted for rotation in at least one edge of each of said control means for varying the direction and magnitude of resultant forces caused by a movement of fluid over said control means;

said flap means further including
mounted on said first end of said rotor shaft;

an inboard turbine having blades angularly pitched relative to the axis of said rotor shaft to provide a driving torque in a first direction fixedly mounted on said first end of said rotor shaft;

a first cylindrical sleeve fitted around said inboard turbine and fixedly attached to rotate with said turbine;

an outboard turbine having blades angularly pitched relative to the axis of said rotor shaft to provide a driving torque in a second direction fixedly mounted on a second end of said rotor shaft;

a second cylindrical sleeve fitted around said outboard turbine and fixedly attached to rotate with said turbine;

means for admitting pressurized fluid to a first end of said turbines;

means for discharging fluid from a second end of said turbines;

means for signalling the status of said rotor shaft operatively connected to said first end of said rotor shaft; and drive means mounted in said body and having a controlled output fluidly communicating with and adapted to rotate said flap means, said controlled output selectively switching the output of said drive means to control the direction and velocity of rotation of said flap means.

References Cited

UNITED STATES PATENTS

| 1,278,750 | 9/1918 | Romualdi | 170—1.5 |
| 3,121,544 | 2/1964 | Alvarez-Calderon | 244—10 |

FOREIGN PATENTS

| 580,053 | 8/1946 | Great Britain. |

OTHER REFERENCES

German printed application No. 1,104,373, Muller.

ANDREW H. FARRELL, Primary Examiner

U.S. Cl. X.R.

114—147